June 5, 1928.  1,672,641
J. F. DREYER, JR., ET AL
MEANS FOR NEUTRALIZING CAPACITY COUPLING
Filed Feb. 20, 1924
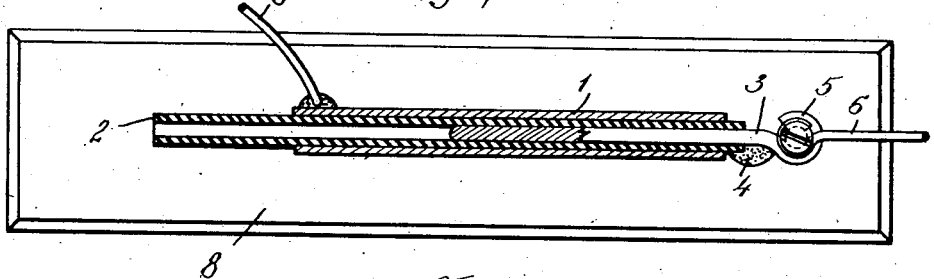
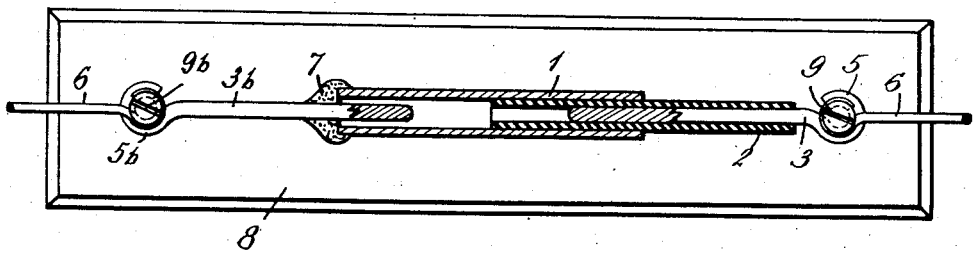
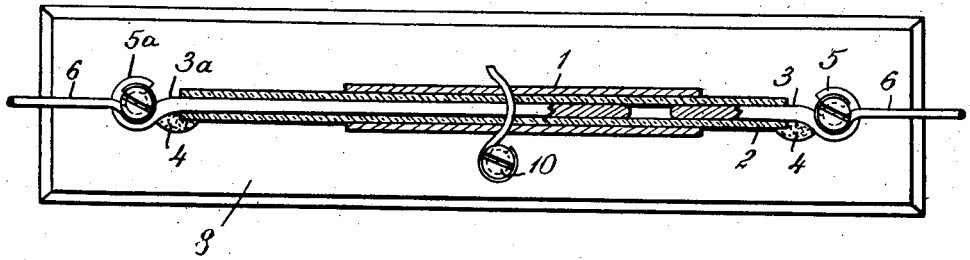
INVENTORS
JOHN F. DREYER, JR.
HARRY W. DREYER
BY
Pennie, Davis, Marvin and Edmonds
his ATTORNEYS Patented June 5, 1928.

1,672,641

UNITED STATES PATENT OFFICE.

JOHN F. DREYER, JR., AND HARRY W. DREYER, OF BROOKLYN, NEW YORK, ASSIGNORS, BY MESNE ASSIGNMENTS, TO HAZELTINE CORPORATION, A CORPORATION OF DELAWARE.

MEANS FOR NEUTRALIZING CAPACITY COUPLING.

Application filed February 20, 1924. Serial No. 694,164.

This invention relates to electric condensers, and especially to condensers employed for the neutralization of capacity coupling in vacuum tube circuits. It has for its object more particularly the provision of a condenser of small electrostatic capacity and of an improved form and design, whereby a fine and permanent adjustment of capacity may readily be attained. Such a device is of especial value in the neutralization of undesired capacity coupling in vacuum tube circuits such as described in Hazeltine United States Letters Patent Nos. 1,450,080, 1,489,228 and 1,533,858.

A fine and accurate adjustment of effective capacity of condensers has heretofore been obtained in various ways, perhaps the most successful having been the mechanical micrometer or "vernier" control or, such as that utilized in the "billi-condenser". However, with the advent of vacuum tube receivers employing capacity neutralization there arose a need for a condenser of very small electro-static capacity, which could be accurately and finely adjusted over a narrow range, say from one to five micro-microfarads without the use of mechanical micrometer or vernier adjustments. It was therefore conceived that a condenser having a large ratio of length to capacity per unit length (i. e., one inch per ten micro microfarads) would enable extremely fine adjustment of its available effective capacity over a narrow, but still a sufficient range.

To these ends a condenser of small size and of very small capacity is provided which possesses low losses and is capable of extremely fine, accurate and permanent adjustment. The form of such a condenser may be tubular and comprise two electrodes, one within another, separated by a dielectric material of small surface area per unit length. The outer electrode under these conditions should be of tubular form and in order to facilitate the adjustment of the effective capacity thereof, one electrode may be movable or slidable axially relative to the other.

A more complete understanding of the present invention may be had from a consideration of the accompanying drawings together with the following description of preferred embodiments as utilized in the neutralization of undesirable capacity coupling in vacuum tube radio receiving apparatus.

Referring to the drawings:

Fig. 1 is a longitudinal section of a simple embodiment of the invention;

Fig. 2 shows a longitudinal section of a modification of the condenser illustrated in Fig. 1;

Fig. 3 is a longitudinal section of a modified form of this invention having two capacities in series.

Referring now to Fig. 1, the condenser illustrated consists of an outside metallic electrode 1 to which a connection 6 may be made by any convenient means and which is preferably tubular in shape, and an inside electrode 3 which may also be tubular, but which is preferably rodlike and may comprise merely a short piece of heavy solid bare copper wire (for example Number 14 A. W. G. gauge) having a hole or hook 5 at one end into which a connection wire 6 may be secured by means of a binding post or by soldering or by any other convenient means. The two electrodes are separated by a dielectric material 2, which should have a high dielectric constant and low dielectric losses, such as possessed by glass, hard rubber, micanite, varnished cambric tubing and the like. The ratio of length to diameter of this dielectric tube may be conveniently about twenty to one.

When small condensers of this type are used for neutralizing capacity coupling, it is usually desirable that the condenser be capable of extremely close and accurate adjustment. For example, to neutralize the inherent capacity coupling between the elements of a three electrode vacuum tube or audion, the capacity of the neutralizing condenser must bear a definite ratio to the capacity of the audion; and to accomplish this result the electrodes of the condenser are made movable axially relative to each other. Since the electro-static capacity of the condenser is proportional to the area of dielectric between the electrodes, it obviously is merely a matter of convenience how that adjustment is made, i. e., whether one or the other of the electrodes or the dielectric material is moved. Once the correct capacity is determined, it is conveniently fixed by means of sealing wax 4, or other equivalent means, which will lock the parts of the condenser against inadvertent movement; or in the case of completed radio receivers to be sold to the public, an absolutely fixed relation may be maintained by some more permanent means.

Fig. 2 shows a modified form of the condenser illustrated in Fig. 1. This embodiment is essentially similar to that above described, and comprises an outer electrode 1, preferably of tubular cross section; an inner electrode 3, which may consist of a short piece of heavy copper wire formed with a hole or a hook at one end, as shown at 5, so that it may be secured by screw 9 to an insulating base 8 and also as a means for connecting a conductor 6. Between the electrodes is a dielectric material 2, which in this embodiment may be varnished cambric tubing or other suitable insulating material. Inner electrode 3 may fit snugly into tubular dielectric 2 in order that no other means need be used to prevent movement of the dielectric. Electrode 1 may be of large enough inside diameter to allow of easy adjustment of the capacity by sliding electrode 1 over dielectric 2. When the final adjustment is obtained, electrode 1 may be locked against any further movement by solder 7 securing it to auxiliary electrode $3^b$, which latter electrode is secured to insulating base 8 by screw $9^b$. In cases where it may be desirable to readjust the capacity, a set screw or equivalent means may be provided to lock together electrodes 1 and $3^b$, as shown at 10, Fig. 3, instead of employing solder as shown in this figure of the drawing.

In order that the condenser may be of more convenient physical proportions and yet possess small capacity and ease of adjustment, a further modification of the condenser shown in Fig. 1 has been developed. This latter form is illustrated in Fig. 3 which shows a condenser consisting of an outside metallic electrode 1 which is preferably tubular in shape, and two inside electrodes 3 and $3^a$ which may also be tubular, but which preferably are rod-like and may comprise merely two short pieces of heavy, solid, bare copper wire, for example #14 American gauge, having hooks 5 and $5^a$ at one end of each electrode respectively, onto which connection wires 6 may be secured by means of binding posts, or by soldering, or in any other convenient way. The internal and external electrodes are separated by a dielectric material 2 which should have a high dielectric constant and low dielectric loss, such as possessed by glass, ebonite, micanite, varnished cambric tubing and the like, as previously suggested. The ratio of length to diameter of this dielectric tube may conveniently be about 20 to 1.

It has been found that the capacity of this condenser may more readily be adjusted when one of the internal electrodes, for instance $3^a$, is longer than the other electrode, 3. By referring to the figure, it will be noted that with this arrangement there is a comparatively greater electrostatic capacity between electrode $3^a$ and the external or intermediate electrode 1 than there is between electrode 1 and the shorter internal electrode 3. Thus the total or effective capacity value of the condenser is the resultant of two capacities in series, as just pointed out, one capacity preferably being larger than the other so that by sliding the external or intermediate electrode 1 axially with respect to the internal electrodes, one of these series capacities is increased, while the other is decreased, and a very fine and accurate adjustment of the effective resultant capacity between the connecting wires 6—6 may be had. By this arrangement, also, the resultant capacity may be very small, as required, and yet the physical size of the unit may be sufficiently large to permit of easy handling. The strap or clamp, shown in the figure, held in place by screw 10, has been found to be a convenient means for locking the external electrode 1 in position after the neutralizing adjustment has been obtained. In commercial practice, it has been found expedient to solder the locking strap to the intermediate electrode in order that the neutralizing adjustment may not be tampered with. The dielectric tube 2 is preferably held in fixed relation to the inside electrodes by means of sealing wax 4, altho frequently these electrodes fit the dielectric tube so tightly that no additional fixing means is necessary. Likewise, it is sometimes desirable, instead of fixing the external electrode by means of a clamping device as shown at 10, to split or slot the electrode so that it will engage frictionally with the dielectric tube.

By referring to the figures, it will be observed that the condenser structure provided by the present invention results in a condenser which allows of extremely fine and accurate determination of its capacity value without including expensive mechanical micrometer adjusting means, such as the finely cut gears or screw threads employed in "billicut condensers" and the like. The condenser of the present invention can, therefore, be manufactured at very small expense and in large quantity without requiring any but extremely simple machining operations. The required raw material may be the ordinary commercial brass or copper tubing together with short pieces of brass or copper wire; the dielectric tubing required being also readily available on the market without further machining. Furthermore, it may be pointed out that the present invention provides a condenser structure which is extremely permanent in capacity adjustment because all of the separate parts of the condenser are supported thruout the greater portion of their length, so that the result is a mechanically rigid structure which can not be inadvertently moved or injured by heavy vibration or mechanical shock to which it may be subjected. For example, once the capacity is adjusted and the clamp 10 (of Fig. 3) tightened, the external electrode 1 is held tightly thruout its length against the insulating base plate 8. The dielectric tube is supported thruout most of its length by the external electrode 1 with which it is in intimate contact; and in turn the internal electrodes 3 and 3ª fit snugly inside dielectric tube 2 thruout substantially their entire length and thus are rigidly supported. The screws 15 and 15ª are serviceable in functioning as binding posts for external connecting wires as well as for assisting clamp 10 in holding the entire condenser rigidly to the base plate 8. Consequently, there is no unsupported portion of the condenser which may be moved by heavy vibration or mechanical shock which, in prior forms of condensers, would tend to change the capacity adjustment of the device.

In the foregoing description of certain preferred embodiments of this invention, the inside electrodes have been conveniently represented as comprising rodlike members, the outside electrode as comprising a metallic tube of circular cross section, and the dielectric material as comprising a tubular member of circular cross section, but it is to be understood that modifications in the general proportions, shape and cross section of these members may be necessary in adapting the invention to other specific applications without in any way departing from the spirit or scope of the invention.

We claim:

A condenser structure capable of fine and permanent adjustment of its electrostatic capacity, comprising two rod-like electrodes of different lengths, inserted one from either end of an insulating dielectric tube, said electrodes fitting snugly in said tube and being not in electrical contact with each other, an intermediate tubular metallic electrode fitted snugly outside said dielectric tube and adjustable longitudinally of said dielectric tube, an insulating base-plate for said structure and a plurality of means for securing said condenser to said base-plate and for making electrical connections to said two rod-like electrodes whereby the elements of said condenser are at all required adjustments rigidly supported thruout the greater part of their lengths, and ease and permanence of adjustment are attained.

In testimony whereof we affix our signatures.

JOHN F. DREYER, Jr.
HARRY W. DREYER.